United States Patent
Vasilyev et al.

(10) Patent No.: US 9,575,207 B1
(45) Date of Patent: Feb. 21, 2017

(54) NANOSTRUCTURED GLASS CERAMIC NEUTRON SHIELD FOR DOWN-HOLE THERMAL NEUTRON POROSITY MEASUREMENT TOOLS

(71) Applicants: Maxim Vasilyev, Houston, TX (US); Valery Khabashesku, Houston, TX (US); Mikhail Korjik, Minsk (BY); Andrei Fedorov, Minsk (BY)

(72) Inventors: Maxim Vasilyev, Houston, TX (US); Valery Khabashesku, Houston, TX (US); Mikhail Korjik, Minsk (BY); Andrei Fedorov, Minsk (BY)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 15/062,373

(22) Filed: Mar. 7, 2016

(51) Int. Cl.
*G01V 5/10* (2006.01)
*G01V 5/06* (2006.01)
*G21K 1/06* (2006.01)
*G21F 1/06* (2006.01)

(52) U.S. Cl.
CPC .............. *G01V 5/107* (2013.01); *G01V 5/101* (2013.01); *G21F 1/06* (2013.01)

(58) Field of Classification Search
CPC ........... G01V 5/101; G01V 5/107; G21F 1/06
See application file for complete search history.

(56) References Cited

U.S. PATENT DOCUMENTS

| | | |
|---|---|---|
| 3,769,160 A | 10/1973 | Hosegood et al. |
| 4,424,444 A | 1/1984 | Smith et al. |
| 4,566,987 A | 1/1986 | Gliemeroth et al. |
| 4,744,922 A | 5/1988 | Blakely et al. |
| 4,808,838 A | 2/1989 | Gold |

(Continued)

FOREIGN PATENT DOCUMENTS

| | | |
|---|---|---|
| GB | 2460345 A | 12/2009 |
| JP | 2004205512 A | 7/2004 |

OTHER PUBLICATIONS

Lecoq, et al. "Inorganic Scintillators for Detector Systems. Physical Principles and Crystal Engineering". Series: Particle Acceleration and Detection. 2006, XII, 251 pages.

(Continued)

*Primary Examiner* — Mark R Gaworecki
(74) *Attorney, Agent, or Firm* — Cantor Colburn LLP

(57) ABSTRACT

An apparatus for providing a signal indicative of a property of an earth formation includes: a carrier conveyable through a borehole; a neutron source disposed on the carrier and configured to emit neutrons into the earth formation; a radiation detector disposed on the carrier and configured to detect radiation from the earth formation due to interaction of emitted neutrons with the earth formation and to provide the signal indicative of the property; and a neutron shield configured to shield the radiation detector from emitted neutrons that did not interact with the earth formation; wherein the radiation detector shield includes a glass ceramic material having a plurality of nano-crystallites, each nano-crystallite in the plurality having a periodic crystal structure with a diameter or dimension that is less than 1000 nm that includes Li and/or Boron and a rare-earth element that have positions in the periodic crystal structure of each nano-crystallite.

18 Claims, 6 Drawing Sheets

(56) References Cited

U.S. PATENT DOCUMENTS

| | | | |
|---|---|---|---|
| 7,312,466 | B2 | 12/2007 | Caldwell |
| 8,080,781 | B2 | 12/2011 | Zhang et al. |
| 8,299,420 | B2 | 10/2012 | Stoller |
| 2008/0105821 | A1 | 5/2008 | Radtke et al. |
| 2009/0014662 | A1 | 1/2009 | Suhami |
| 2009/0104179 | A1 | 4/2009 | Boyden et al. |
| 2009/0302195 | A1 | 12/2009 | Muenchausen et al. |
| 2010/0223010 | A1 | 9/2010 | Nikitin et al. |
| 2011/0062319 | A1 | 3/2011 | Nikitin et al. |
| 2012/0080588 | A1* | 4/2012 | Smith, Jr. .............. G01V 5/101 250/269.6 |
| 2012/0228510 | A1 | 9/2012 | Clonts et al. |
| 2012/0267519 | A1 | 10/2012 | Nikitin et al. |
| 2012/0286166 | A1 | 11/2012 | Osinski et al. |
| 2013/0069656 | A1 | 3/2013 | Haramboure et al. |
| 2013/0075600 | A1 | 3/2013 | Nikitin et al. |
| 2013/0327986 | A1 | 12/2013 | Blahuta et al. |
| 2014/0166889 | A1 | 6/2014 | Kang et al. |
| 2014/0367562 | A1* | 12/2014 | Vasilyev ................. G01V 5/08 250/269.1 |
| 2015/0076335 | A1 | 3/2015 | Vasilyev et al. |
| 2015/0185358 | A1* | 7/2015 | Stoller ................. G01V 5/101 250/269.6 |
| 2016/0061990 | A1* | 3/2016 | Cooper .............. E21B 47/1015 250/256 |

OTHER PUBLICATIONS

Annenkov, et al., "Lead tungstate scintillation material". Nucl. Instr. and Meth. in Phys. Res. A, 490 (2002). 21 pages.

Beall, G.H.,"Design and properties of glass-ceramics", Annu.Rev. Matter.Sci. 22(1992). 30 pages.

Beckurts, et al.; "Neutron Physics"; (1964); Springer-Verlag OHG; pp. 1-215.

Beckurts, et al.; "Neutron Physics"; (1964); Springer-Verlag OHG; pp. 216-444.

Bliss, et al. "Relationship between microstructure and efficiency of scintillation glasses", PNLSA-23185, Apr. 1994. 13 pages.

Bondar, et al. "Optical Properties of Undoped and YB3+-Doped YAl3 (BO3)4 Crystals"; (2008); Inorganic Materials; 3 pages.

Mughabghab, et al; "Neutron Cross Sections from Neutron Resonance Parameters and Thermal Cross Sections"; (1981); Retrived from the Internet:, URL: http://ie.lbl.gov/ngdata/sig.html.pdf, 15 pages.

Mughabghab, S.F.; "Atlas of Neutron Resonances, Resonance Parameters and Thermal Cross Sections Z-100"; (2006); Elsevier; pp. 1-16-3.

Mughabghab, S.F.; "Atlas of Neutron Resonances, Resonance Parameters and Thermal Cross Sections Z-100"; (2006); Elsevier; pp. 16-4-36-7.

Mughabghab, S.F.; "Atlas of Neutron Resonances, Resonance Parameters and Thermal Cross Sections Z-100"; (2006); Elsevier; pp. 36-8-50-29.

Mughabghab, S.F.; "Atlas of Neutron Resonances, Resonance Parameters and Thermal Cross Sections Z-100"; (2006); Elsevier; pp. 50-30-76-15.

Mughabghab, S.F.; "Atlas of Neutron Resonances, Resonance Parameters and Thermal Cross Sections Z-100"; (2006); Elsevier; pp. 76-16-100-1.

Neal, John, et al., "Evaluation of Neutron and Gamma Detectors for High-Temperature Well-Logging Applications", Oak Ridge National Laboratory, Oak Ridge, TN, USA, IEEE 978-1-4673-5836-1, 2011, 4 pages.

Nikitin, Anton, et al., "Needs of Well Logging Industry in New Nuclear Detectors", IEEE, 2010, 6 pages.

Spowart, A.R., "Neutron scintillation glasses": Part1, NIM 135 (1976). 13 pages.

Takahashi, "The Temperature Dependence of Gamma-Ray Repsonses of YAG:Ce Ceramic Scintillators", IEEE Transactions on Nuclear Science, vol. 53, No. 4, Aug. 2006, pp. 2404-2408.

\* cited by examiner

NANOSTRUCTURED GLASS CERAMIC NEUTRON SHIELD FOR DOWN-HOLE THERMAL NEUTRON POROSITY MEASUREMENT TOOLS

BACKGROUND

Earth formations may be used for various purposes such as hydrocarbon production, geothermal production and carbon dioxide sequestration. The earth formations are typically accessed by drilling boreholes that penetrate the formations or reservoirs in the formations. In order to efficiently use expensive resources for drilling and production, it is important for petro-analysts and engineers to acquire accurate and detailed information related to the earth formations of interest.

One way to acquire the needed information is by performing measurements with tools or instruments that are conveyed through a borehole such as for example by a wireline, referred to as wireline logging, or by a drill string, referred to as logging-while-drilling (LWD) or measurement-while-drilling (MWD). In wireline logging, the tool may be required to operate in a borehole filled with drilling mud or other fluids. In LWD and MWD applications, the tools or instruments are attached to a drill string that is used to drill a borehole. The measurements are generally performed while the drill string rotates to turn a rock disintegrating device. Challenges may arise due to effects of the borehole fluids in wireline logging and drill string operation in LWD and MWD. Hence, improvement in the accuracy of wireline, LWD or MWD measurements would be well received in the drilling and production industries.

BRIEF SUMMARY

Disclosed is an apparatus for providing a signal indicative of a property of an earth formation. The apparatus includes: a carrier configured to be conveyed through a borehole penetrating the earth formation; a neutron source disposed on the carrier and configured to emit neutrons into the earth formation; a radiation detector disposed on the carrier and configured to detect radiation from the earth formation due to interaction of emitted neutrons with the earth formation and to provide the signal indicative of the property; and a radiation detector neutron shield configured to shield the radiation detector from emitted neutrons that did not interact with the earth formation; wherein the radiation detector shield includes a glass ceramic material having a plurality of nano-crystallites, each nano-crystallite in the plurality having a periodic crystal structure with a diameter or dimension that is less than 1000 nm that includes Li and/or Boron and a rare-earth element that have positions in the periodic crystal structure of each nano-crystallite.

Also disclosed is a method for providing a signal indicative of a property of an earth formation. The method includes: conveying a carrier through a borehole penetrating the earth formation; emitting neutrons into the earth formation using a neutron source disposed on the carrier; detecting radiation from the earth formation due to interaction of emitted neutrons with the earth formation using a radiation detector configured to provide a signal indicative of the property; shielding the radiation detector from emitted neutrons that did not interact with the earth formation using a radiation detector neutron shield, wherein the radiation detector shield includes a glass ceramic material having a plurality of nano-crystallites, each nano-crystallite in the plurality having a periodic crystal structure with a diameter or dimension that is less than 1000 nm that includes Li and/or B and a rare-earth element that have positions in the periodic crystal structure of each nano-crystallite.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method is presented herein by way of exemplification and not limitation with reference to the figures.

Disclosed is a downhole tool that is shielded from neutrons using a shield made of a glass ceramic material having rare earth elements in nano-crystallite form. In one or more embodiments, the down-hole tool may be configured for performing measurements of an earth formation. The downhole tool may include a neutron source, neutron detector (or detectors) and a neutron shield. The neutron shield is placed in proximity of the neutron detector, such as for example a lithium glass or glass-ceramic based neutron detector, for elimination of neutrons scattered by construction elements of a well or drilling system. The teachings herein disclose the use as a shield of a nanostructured glass ceramic material possessing high stopping power to scattered neutrons. Radiation detectors sensitive to gamma-rays may also be shielded from "parasitic" counts due to neutrons rather than gamma-rays coming from an earth formation being characterized. For example, neutron porosity tools may include gamma-ray sensitive detectors in order to provide the user with a wider range of measurements. Other types of gamma-sensitive sensors may also be shielded by this shield.

The nanostructured glass ceramic contains atoms of elements, such as boron, lithium and rear earth elements, with high cross-section of interaction with neutrons in the energy range from thermal and epithermal neutrons to at least resonance neutrons. Such elements are packed into high-density ceramic body, and their combinations are selected in order to reduce the level of gamma radiation background originating from neutron radiative capture in the neutron shield and ultimately reduce the unwanted increase of background count rate of the neutron detector. The term "nano-structured glass ceramic material" relates to a glass ceramic material having a plurality of nano-crystallites, each nano-crystallite in the plurality having a periodic crystal structure with a diameter or dimension that is less than 1000 nm that includes a rare-earth element that has positions in the periodic crystal structure of each nano-crystallite. U.S. patent application Ser. No. 14/484,581 filed Sep. 12, 2014 discusses glass ceramic-based neutron detectors and techniques for fabricating glass-ceramic based materials and is incorporated by reference herein in its entirety.

Figure 1:
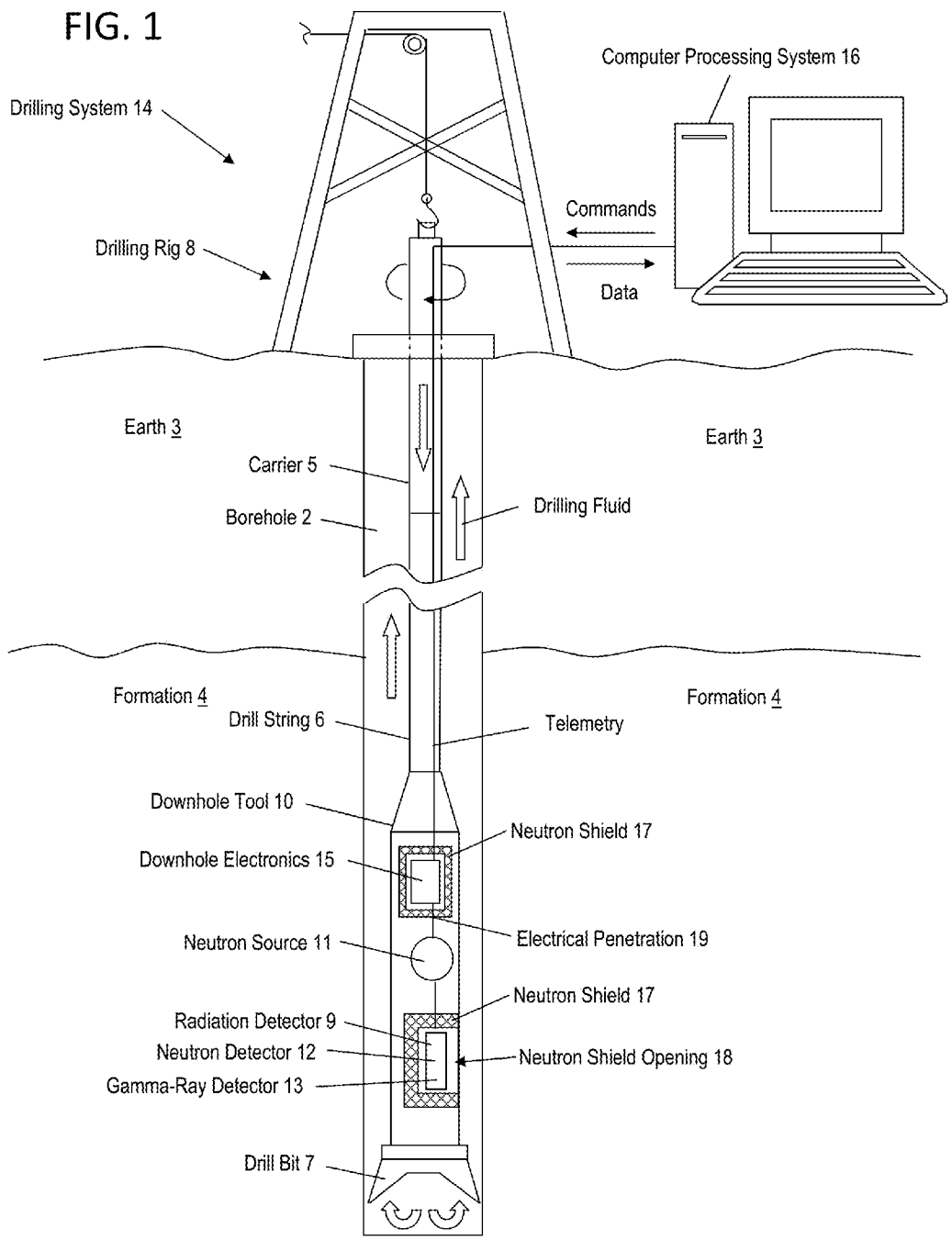
FIG. 1 depicts aspects of a drilling system for drilling a borehole penetrating the earth.

Apparatus for implementing the disclosure is now discussed in more detail. FIG. 1 illustrates a cross-sectional view of an embodiment of a drilling system 14 configured to drill a borehole 2 penetrating the earth 3, which may include a formation 4. The borehole may also be referred to as a well. The formation 4 may include a reservoir of hydrocarbons that the borehole 2 is designed to access. A downhole tool 10 is conveyed through the borehole 2 by a carrier 5, which can be a drill string 6. In alternative embodiments, the carrier 5 may be an armored wireline for wireline logging. A drill bit 7 is disposed at the distal end of the drill string 6. A drill rig 8 is configured to conduct drilling operations such as rotating the drill string 6 and thus the drill bit 7 in order to drill the borehole 2. In addition, the drill rig 8 is configured to pump drilling fluid (or mud) though a mud channel in the drill string 6 in order to lubricate the drill bit 7 and flush cuttings from the borehole 2.

The downhole tool 10 is configured to perform measurements of one or more properties of the formation 4. In order to perform the measurements, the downhole tool 10 includes a neutron source 11 such as a pulsed neutron generator that is configured to electronically emit a pulse of neutrons into the formation. The tool 10 also includes a radiation detector 9, such as a neutron detector 12, which is configured to detect or measure radiation resulting from an interaction of the neutrons with atoms of the formation 4. In other embodiments, the radiation detector 9 may be a gamma-ray detector 13. Downhole electronics 15 are configured to operate the downhole tool 10, process data acquired by the tool 10, and/or act as an interface with telemetry for transmitting data to or receiving commands from a surface computer processing system 16. Some or all tool operating and/or data processing functions may be performed by the surface computer processing system 16. The nano-structured glass ceramic-based neutron shield 17 may be used to shield the downhole electronics 15 from neutrons that may cause a degradation of the electronics and affect their operability. The nano-structured glass ceramic-based neutron shield 17 also shields and the radiation detector 9 from neutrons that are not intended to be detected such as neutrons scattered by well structures or drilling system structures such as drill string structures or mud in the mud channel. In general, the shield 17 for shielding the radiation detector 9 includes an opening 18 in which there is no shielding or a reduced thickness of shielding compared to the shielding 17 not at the opening 18. The opening 18 is configured to receive neutrons from the formation 4 after these neutrons have interacted with the atoms of the formation 4. The neutron shield 17 may include an electrical penetration 19 for connecting an electrical conductor to the radiation detector 9 and/or the downhole electronics 15. In one or more embodiments, the electrical penetration 19 is formed by inserting an electrical conductor into the glass ceramic material when the glass ceramic material is in a molten state.

Using the data acquired by the downhole tool 10, one or more properties of the formation 4, such as porosity, density or boundary locations, may be estimated using algorithms known in art and implemented by a processor such as in the surface computer processing system 16.

Further aspects and advantages of the disclosure are now discussed. Use of neutron generators in well logging unavoidably results in scattering by construction elements of a well and/or drilling system of some portion of generated neutrons. Conventional neutron detectors which are based on neutron reactions with $^3$He, $^6$Li and $^{10}$B cannot distinguish the neutrons scattered by the construction elements from "useful" neutrons scattered by the formation. As a result, "useful" detection spectrum, produced from formation, becomes distorted and measurement errors of hydrocarbons in the formation result. Thus, cut-off of thermal, epithermal and higher energy neutrons from the borehole and construction elements is a desired objective in well logging and downhole measurements.

In a down-hole detector based on Li-6 glass or glass-ceramic material, the gamma energy equivalent of the neutron absorption peak is in the range of 1.5-1.8 MeV. Due to this, all gamma quanta emitted from the neutron shield with energies larger than 1.5 MeV will contribute to the neutron detector "useful" neutron peak due to pedestal from Compton scattering events. Gamma-lines from (n,γ) radiative capture reactions with energies close to the neutron peak energy equivalent will distort the shape of "useful" neutron peak. Gamma-lines with energies much higher than 1.5 MeV will give rather flat and low-intensity pedestal from Compton scattering events only. Gamma-lines with energies lower than 1.5 MeV will generally not influence "useful" neutron peak (besides possible coincidences at very high-count rates).

Figure 2:
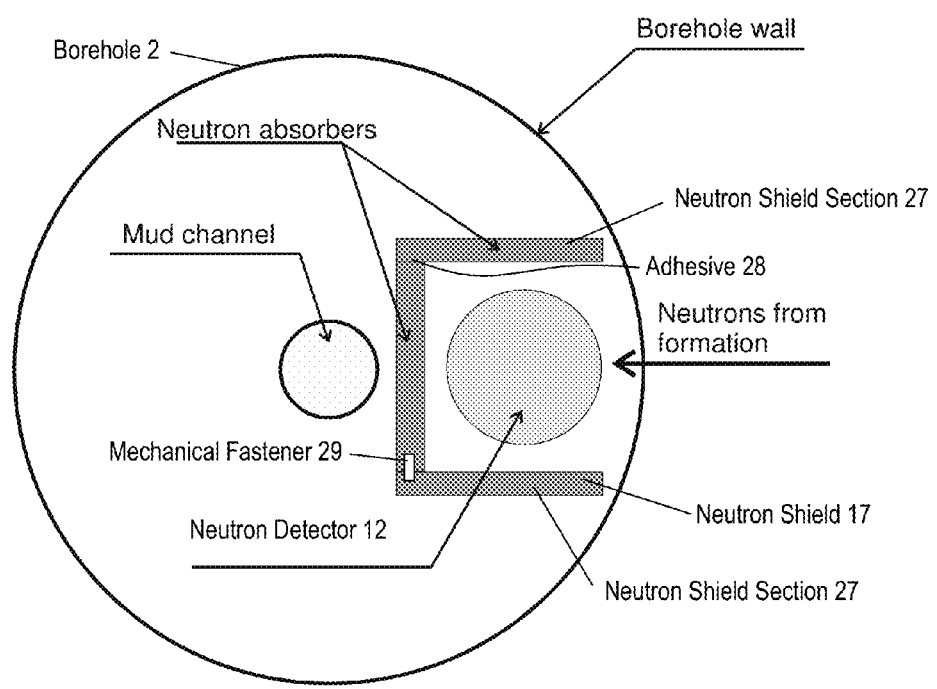
FIG. 2 depicts aspects of a neutron detector shielded by a glass ceramic neutron shield.

The neutron shield 17 is configured to provide directional sensitivity of the neutron detector (or radiation detector) to increase precision and accuracy of the formation characterization through reducing the reading from borehole-scattered neutrons and non-formation-scattered neutrons as illustrated in the top view in FIG. 2. The neutron shield 17 may be made up of a plurality of neutron shield sections 27 to form a desired geometry. The sections 27 may be connected together by an adhesive 28 and/or a mechanical fastener 29 such as threaded connector. Alternatively, the neutron shield 17 may be formed as one monolithic piece of glass ceramic material. The neutron shield 17 when shielding a radiation detector may be referred to as a radiation detector neutron shield. As illustrated in FIG. 2, a mud channel provides for drilling fluid to flow through the interior of the drill string. The drilling fluid and/or the mud channel may also scatter neutrons emitted by the neutron source, so the neutron shield may be configured to shield against the neutrons scattered by those non-formation elements. In wireline logging applications, neutrons may be scattered by the drilling mud or fluid in the borehole surrounding the wireline logging tool and/or by well construction elements.

Figure 3:
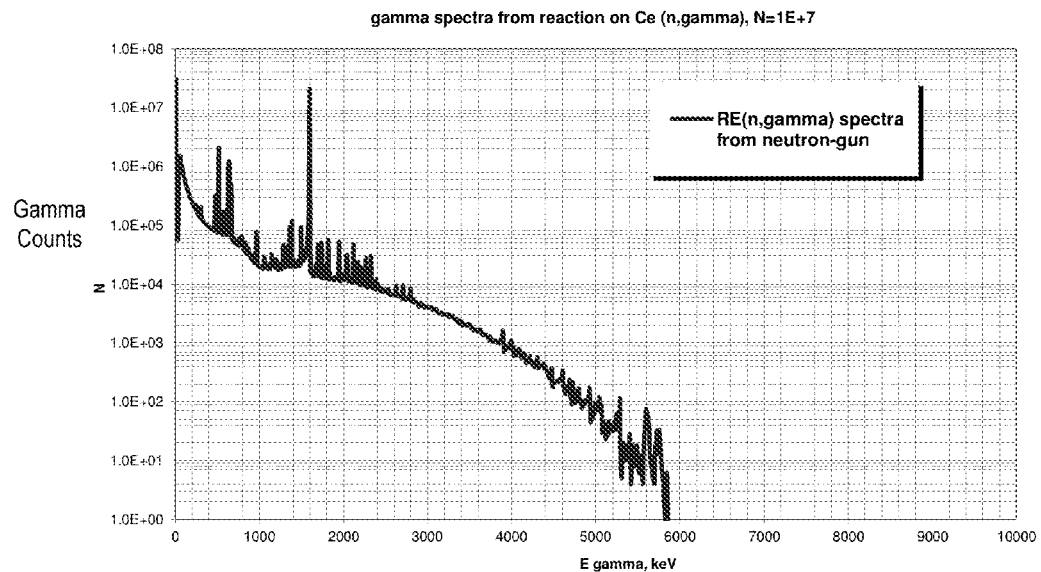
FIG. 3 depicts aspects of a spectra of gamma rays produced by neutron-gamma ray reactions with cesium (Ce)

FIG. 3 illustrates an example of when a rare-earth neutron shield made of cerium is irradiated by a neutron flux of high energy neutrons. A gamma line with energy of ~1.6 MeV close to the energy equivalent of the neutron detector "useful" neutron peak from a 14 MeV neutron generator. This gamma line may distort the shape of the output of the neutron detector and add a significant background pedestal. This example and other examples disclosed herein were generated by a simulation using GEANT4 software where N equals the number of incident neutrons in the simulation. In these examples, N=1×10⁷.

Figure 4:
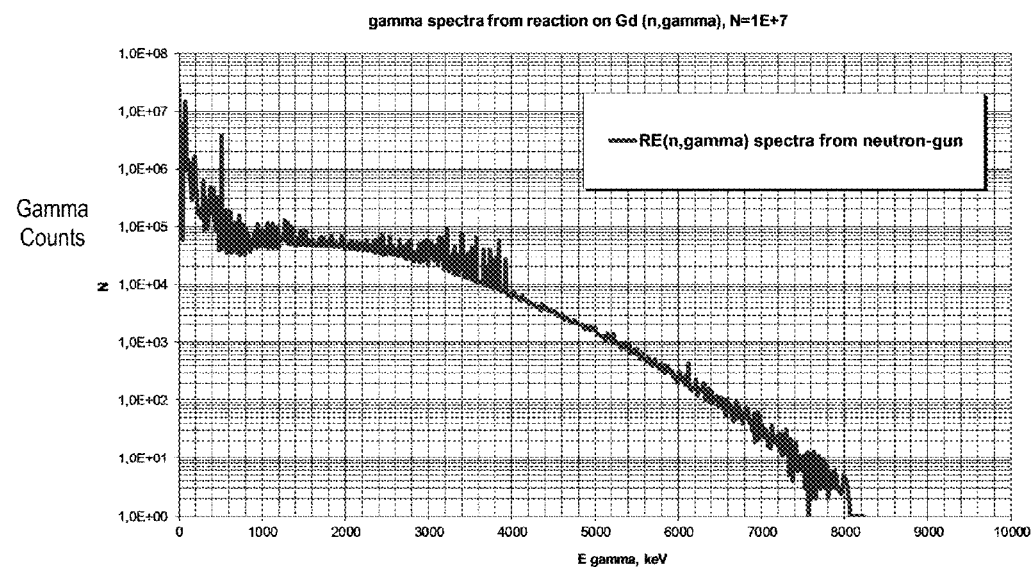
FIG. 4 depicts aspects of a spectra of gamma rays produced by neutron-gamma ray reactions with gadolinium (Gd)

FIG. 4 illustrates an example of when a rare-earth neutron shield made of gadolinium (Gd) is irradiated by a neutron flux of high energy neutrons. Gamma lines with energies in the range of 1.5-4 MeV result from the irradiation and may distort "useful" neutron peak shape and add significant background pedestal.

Figure 5:
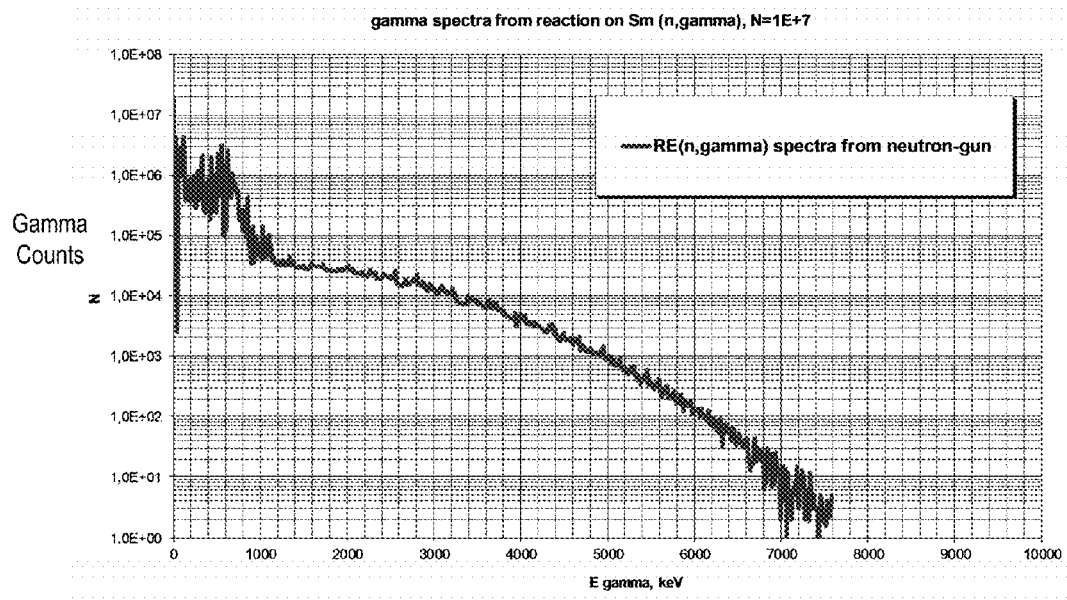
FIG. 5 depicts aspects of a spectra of gamma rays produced by neutron-gamma ray reactions with samarium (Sm)

FIG. 5 illustrates an example of when a rare-earth neutron shield made of samarium (Sm) is irradiated by a neutron flux of high energy neutrons. Gamma lines with energies below 1.5 MeV result from the irradiation and will not distort "useful" neutron peak shape or add background pedestal.

Figure 6:
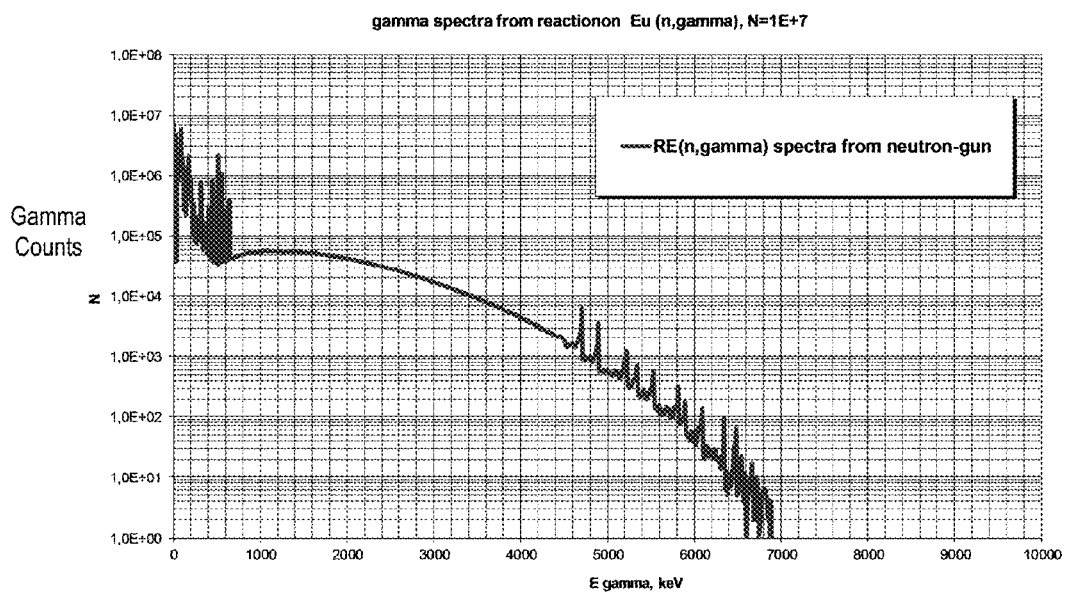
FIG. 6 depicts aspects of a spectra of gamma rays produced by neutron-gamma ray reactions with europium (Eu)
Figure 7:
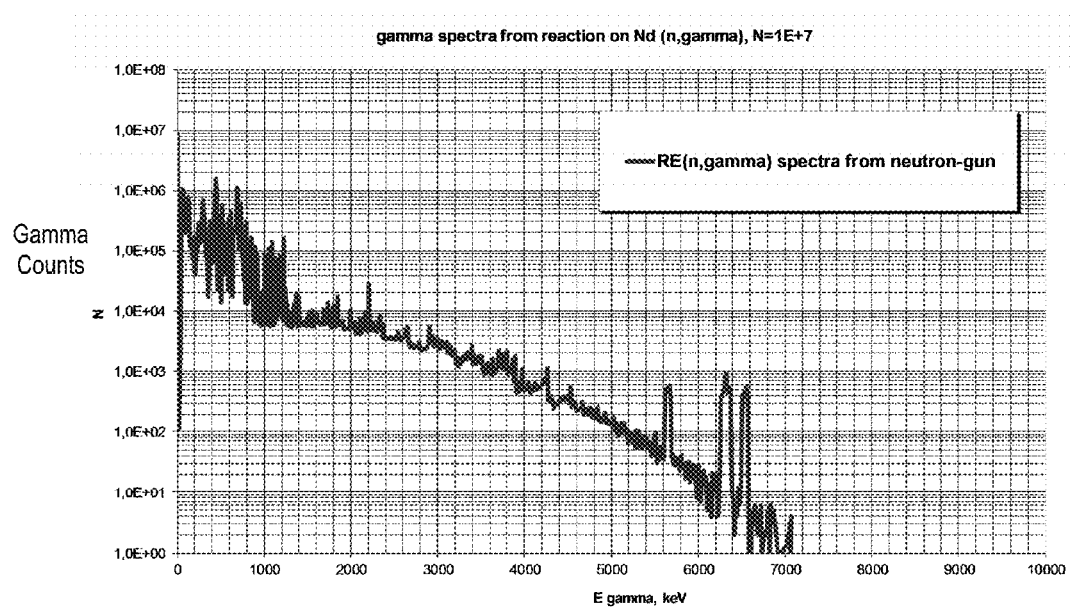
FIG. 7 depicts aspects of a spectra of gamma rays produced by neutron-gamma ray reactions with neodymium (Nd)
Figure 8:
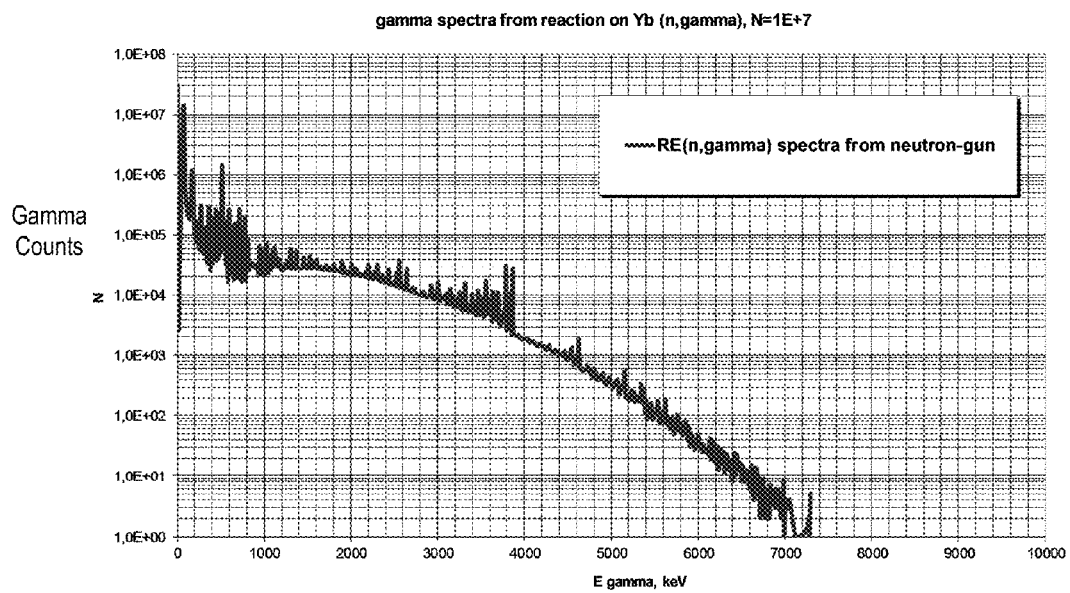
FIG. 8 depicts aspects of a spectra of gamma rays produced by neutron-gamma ray reactions with ytterbium (Yb)

FIGS. 6, 7 and 8 illustrate examples of responses of neutron shields made of Europium (Eu), Neodymium (Nd) and ytterbium (Yb), respectfully, due to irradiation by a neutron flux of high energy neutrons.

In general, to protect a down-hole neutron detector from unwanted neutrons scattered by construction elements of a well or drilling system, non-gamma-radiative nuclear reactions are preferable, e.g. (neutron, alpha-α). Alpha particle (or triton), produced after neutron absorption, can be completely absorbed by thin neutron shielding. For thermal neutrons, the most commonly used reactions are $^6$Li(n,α) T and $^{10}$B(n,α)$^7$Li. In the reaction with $^6$Li no gamma-quanta emits, in the reaction with $^{10}$B Eγ=0.48 MeV only.

Also, neutron radiation from neutron generators used in well logging brings unwanted additional radiation load to the electronic components of a down-hole tool. Contemporary neutron pulse generators produce more than 10⁸ neutrons per pulse, and their pulse rate may vary from 1 to 10⁴ pulses per second in one or more embodiments.

At neutron generator count rates higher than 10¹² neutron per second, or up to 10¹⁶ in an hour, the problem of down-hole tool electronics radiation hardness and stability arises. A neutron full-absorbing material, without emission of energetic (and better none) gamma quanta and charged particles to outside the material (i.e., shield), is a necessary option to protect down-hole tool electronics.

From these points of view, an ideal neutron shield for a down-hole tool should be made of a non-gamma-radiative moderator material for fast or resonance neutrons with high scattering cross section (or at least a material showing the most intense lines with Eγ<1.5 MeV due to (n,γ) radiative capture reactions), and be combined with an efficient absorber of thermal and epithermal neutrons based on (n,α) reaction. This means that such material should be either layered material or composite using prior art technology. Unfortunately, $^{10}$B and $^6$Li cannot be produced or practically used as metal screens or foils.

As disclosed herein, glass ceramic neutron shielding approach resolves this problem. Glass ceramics based on Li—Si-RE or Li—B-RE glass (lithium or boron glass) systems with Rare-Earth (RE) elements are able to combine B, Li, Gd, Eu, Sm etc. elements in compactly-packed high density (>4 g/cm³) glass ceramic body, which is thermally stable and rugged for down-hole use.

Table 1 summarizes thermal neutron absorption cross sections (c.s.) $\sigma_{n,\gamma}$ and resonance integrals $I_\gamma$, measured for some rare earth elements in natural composition and Li and B isotopes after Cd filter, from 0.5 eV to ∞.

TABLE 1

| Element | $\sigma_{n,\gamma}$ | $I_\gamma$ | Comment |
|---|---|---|---|
| Sm | 5800 | 1400 | |
| Er | 162 | 740 | |
| Eu | 4600 | 6320 | expensive |
| Gd | 49000 | 390 | strong gamma |
| Yb | 37 | 182 | high scattering c.s. |
| Nd | 51 | 45 | high scattering c.s. |
| Li | 940 ($^6$Li) | 425 ($^7$Li) | |
| B | 3840 ($^{10}$B) | 1722 ($^{10}$B) | |

In one or more embodiments, glass or glass ceramic neutron shielding may combine such elements as Sm, Yb or Nd, $^6$Li or $^{10}$B. Eu is generally better than Sm, but can be too expensive. Gd is better too, but generally produces too many gammas.

Several glass compositions allowing high density of the resulting glass can be considered. Among them, those which allow production of nanostructured glass ceramics by heat treatment are preferred. There are several compositions of stoichiometric compounds, namely: BaO—SiO2 with the mol. ratio (1:1, 2:3, 1:2); a composition of BaO and SiO₂ with mol. ratio 1:2 with addition of CeO₂ as an excess to composition allows production of glass or glass ceramics; and a composition of BaO and SiO₂ with mol. ratio 2:3 with addition of CeO₂ as an excess to composition has the melting temperature close to the composition of BaO and SiO₂ with mol. ratio 1:2. Barium (Ba) is one example of a glass body forming element. Density of the glass ceramic obtained from composition 2:3 is larger than 3.7 g/cm3, whereas density of the glass ceramic obtained from composition 1:2 does not exceed 3.5 g/cm3. Both compositions allow an addition of rare earth ion oxides as an excess to composition, however, incorporation of sufficient amount of rare earth ions or their combination into the composition requires introduction of modifying ions, which are, as a rule, light species, such as Na, Mg, Ca etc.

Further increase of the glass ceramic density and increase of neutron absorption ability is achieved by admixture of stoichiometric composition of RE₂O₃ and SiO₂ with 1:1 mol. ratio to the composition of 2:3 mol. ratio of BaO and SiO₂. RE means the sum of oxides Sm₂O₃, Er₂O₃, Yb₂O₃, Nd₂O₃. As an example, sum of oxides Sm₂O₃, Er₂O₃, Yb₂O₃, Nd₂O₃ is obtained with a partial molar concentration (weight %) 41.65(40); 23.73(25); 18.44(20); 16.19(15) in the sum, respectively. Glass ceramics obtained from these compositions have density higher than 4 g/cm³.

Further increases of the temperature of the glass working are achieved by use of the composition of oxides and fluorides of RE. Resulting glass ceramic is oxy-fluoride glass. Starting composition to prepare glass ceramics can be made by several ways: mechanical mixture of the chemicals and sol-gel approach. Sol-gel approach is a preferable procedure for the oxy-fluoride composition preparation. The sol-gel process is a wet-chemical technique (also referred to as chemical solution deposition) used in the fields of material science and ceramic engineering primarily for the fabrication of materials such as a metal oxide starting from a chemical solution (sol), which acts as the precursor for an integrated network (or gel) of either discrete particles or network polymers.

Nano-structuring of the glass ceramics allows the increase in density of the glass ceramics. Thermal treatment of the glass ceramics obtained from the admixture of stoichiometric composition of RE₂O₃ (RE here means the sum of oxides Sm₂O₃, Er₂O₃, Yb₂O₃, Nd₂O₃) and SiO₂ with 1:1 mol. ratio to the composition of 2:3 mol. ratio of BaO and SiO$_2$ at a temperature in the range 800-900° C. launches crystallization of plurality of crystallites in the body of the glass ceramic. X-ray diffraction (XRD) measurements have identified several types of the crystallites in the material namely: BaSi2O5, RE2Si2O7, RE2O3, Ba3Si5O13, and BaRE2Si3O10. Creation of nanocrystallites leads to compacting of the glass ceramic and results in a commensurate increase of the density of the glass ceramic. Two hours of annealing of the glass ceramic having the composition described above at 830° C. increases density from 3.92 g/cm$^3$ to 4.12 g/cm$^3$ where as the density is increased to 4.5 g/cm$^3$ at the same duration annealing at 870° C. Increasing the annealing temperature to above 1100° C. or increasing the duration of the annealing leads to creation of the microcrystallites. Because microcrystallites have different crystal structure and different symmetry of the crystal structure, their creation inside the glass is correlated with creation of pores and other inperfections. Microceramics which contain a plurality of microcrystallites of different structure have decreased density due to increased pore size and deteriorated mechanical properties.

Boron ions similar to silica ions also create glass ceramics. Several glass compositions allowing a large fraction of RE in the resulting glass can be considered. Among them, those which allow producing glass ceramics at treatment by heating are preferable. There are several compositions creating stoichiometric compounds of RE and B ions allowing crystallization, namely: YAl$_3$(BO$_3$)$_4$. Compounds with above formula have the structure of huntite and can be produced in a crystalline and glass ceramic form. Density of the glass ceramic obtained from stoichiometric composition is greater than 3.4 g/cm3. To increase density and reach needed neutron absorption properties, yttrium in the composition can be substituted by set of RE. Aluminium (Al) ions also can be substituted by gallium Ga ions. RE here means the sum of rare-earth oxides Sm$_2$O$_3$, Er$_2$O$_3$, Yb$_2$O$_3$, Nd$_2$O$_3$. As an example, sum of oxides Sm$_2$O$_3$, Er$_2$O$_3$, Yb$_2$O$_3$, Nd$_2$O$_3$ is with partial molar concentration in percent (%) and (weight % in parenthesis) 41.65(40); 23.73(25); 18.44(20); 16.19(15) in the sum, respectively. (Partial molar concentration relates to the relative concentration of different molecules in a selected volume. Weight percent relates to the ratio of weight of different molecules with respect to the total weight of the molecules in a selected volume.) Glass ceramics obtained from these compositions have a density more than 3.9 g/cm$^3$.

Various embodiments of glass ceramic materials used for the neutron shield are now disclosed.

In one or more embodiments, the neutron shield or absorption screen (screens) is made of glass ceramic containing the composition of $^{10}$B, $^6$Li and oxides, Sm$_2$O$_3$, Er$_2$O$_3$, Yb$_2$O$_3$, Nd$_2$O$_3$.

In one or more embodiments, the neutron shield or absorption screen (screens) is made of glass ceramic containing the composition of $^{10}$B, $^6$Li and mixture of RE oxides Sm$_2$O$_3$, Er$_2$O$_3$, Yb$_2$O$_3$, Nd$_2$O$_3$ with partial molar concentration in percent (weight %), 41.65(40); 23.73(25); 18.44(20); 16.19(15), respectively.

In one or more embodiments, the neutron shield or absorption screen (screens) is made of glass ceramic containing the composition of a natural B and oxides, Sm$_2$O$_3$, Er$_2$O$_3$, Yb$_2$O$_3$, and Nd$_2$O$_3$. (Natural boron relates to the mixture of boron isotopes present in nature.)

In one or more embodiments, the neutron shield or absorption screen (screens) is made of glass ceramic containing the composition of natural B and a mixture of RE oxides Sm$_2$O$_3$, Er$_2$O$_3$, Yb$_2$O$_3$, Nd$_2$O$_3$ with partial molar concentration in percent (weight %), 41.65(40); 23.73(25); 18.44(20); 16.19(15), respectively.

In one or more embodiments, the neutron shield or absorption screen (screens) is made of glass ceramic containing the composition of $^{10}$B and RE oxides, Sm$_2$O$_3$, Er$_2$O$_3$, Yb$_2$O$_3$, Nd$_2$O$_3$.

In one or more embodiments, the neutron shield or absorption screen (screens) is made of glass ceramic containing the composition of $^{10}$B and mixture of RE oxides Sm$_2$O$_3$, Er$_2$O$_3$, Yb$_2$O$_3$, Nd$_2$O$_3$ with partial molar concentration (weight %), 41.65(40); 23.73(25); 18.44(20); 16.19 (15), respectively.

Figure 9:
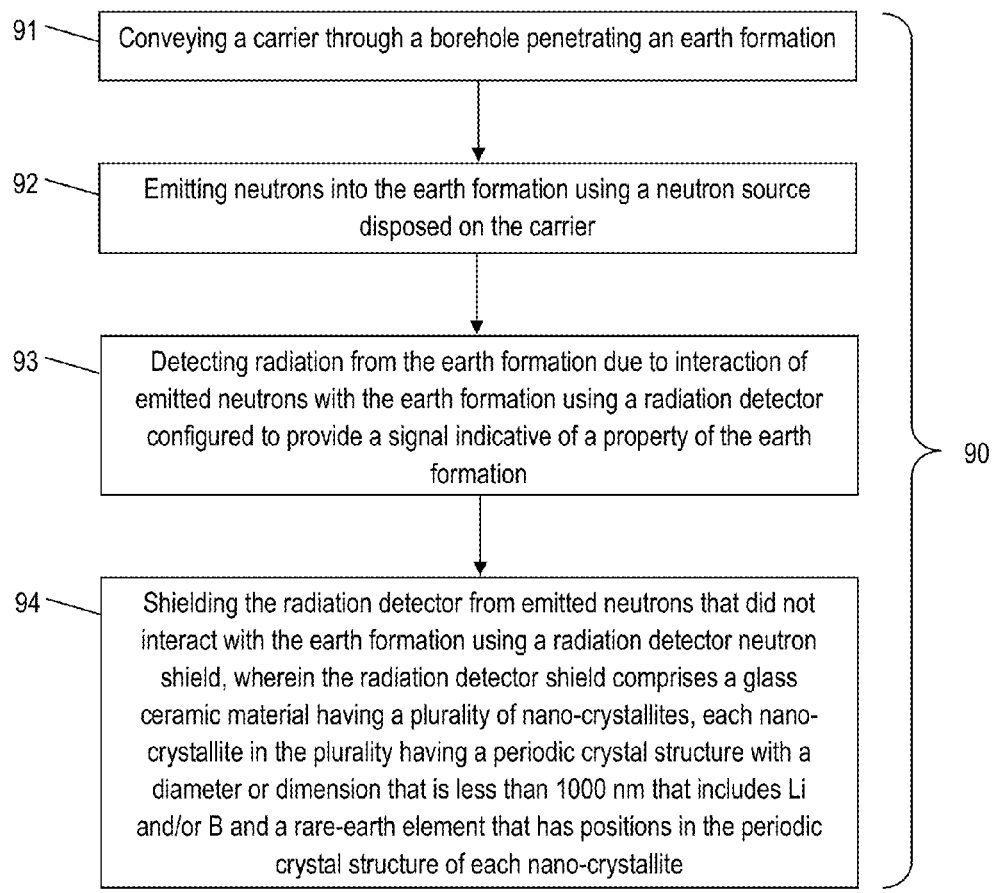
FIG. 9 is a flow chart for a method for performing a downhole measurement.

FIG. 9 is a flow chart for a method 90 for performing a downhole measurement. Block 91 calls for conveying a carrier through a borehole penetrating the earth formation. Block 92 calls for emitting neutrons into the earth formation using a neutron source disposed on the carrier. In one or more embodiments, the neutron source is an electronic-pulsed neutron source that emits a pulse of neutrons for a selected time duration. Block 93 calls for detecting radiation from the earth formation due to interaction of emitted neutrons with the earth formation using a radiation detector configured to provide a signal indicative of the property. In one or more embodiments, the radiation detector is a neutron detector configured to detect (inclusive of measuring) neutrons and/or a gamma-ray detector configured to detect gamma-rays. Block 94 calls for shielding the radiation detector from emitted neutrons that did not interact with the earth formation using a radiation detector neutron shield, wherein the radiation detector shield includes a glass ceramic material having a plurality of nano-crystallites, each nano-crystallite in the plurality having a periodic crystal structure with a diameter or dimension that is less than 1000 nm that includes Li and/or B and a rare-earth element that has positions in the periodic crystal structure of each nano-crystallite. External to the nano-crystallites is amorphous material. This amorphous material contains all the same elements that are in the nano-crystallites including the rear-earth ones.

The method 90 may also include shielding downhole electronics disposed on the carrier and coupled to the radiation detector from neutrons emitted by the neutron source using a downhole electronics neutron shield, the downhole electronics neutron shield comprising a glass ceramic material having a glass ceramic material that includes a plurality of nano-crystallites, each nano-crystallite in the plurality having a periodic crystal structure with a diameter or dimension that is less than 1000 nm and includes a rare-earth element that has positions in the periodic crystal structure of each nano-crystallite.

The method 90 may also include selecting one or more rare-earth elements for inclusion in the nano-crystallites so that there are no resonance gamma-rays in a gamma-energy range of interest when the gamma-ray detector 13 is used for measurements. The corresponding advantage is to prevent resonance gamma-rays from interfering with measurement of gamma-rays received from the earth formation. The resonance gamma-rays are those gamma-rays having one or more energy peaks as illustrated in FIGS. 3-8 for various rare earth elements. In one or more embodiments, the energy range of gamma-rays to be avoided is the energy range of interest of the gamma-ray detector such as, for example, from 100-200 keV up to at least 3 MeV. In one or more embodiments, the energy range of interest of the gamma-ray detector is 1.5 MeV and above to as high as about 8 MeV because as discussed above gamma-lines with energies lower than 1.5 MeV will generally not influence the "useful" neutron peak for measurements of interest.

The neutron shield disclosed herein has several advantages. One advantage is that the shield material has a higher density than prior art neutron shields and is thus more effective at absorbing neutrons. Consequently, downhole measurements using sensors shielded by the disclosed neutron shield are generally more focused on the elements being sensed without interference from neutrons not of interest, thereby resulting in more accurate measurements. Another advantage is that downhole electronics or other components subject to degradation by neutron irradiation may also be shielded by the disclosed neutron shield to provide continued operation without the effects of degradation.

Set forth below are some embodiments of the foregoing disclosure:

Embodiment 1

An apparatus for providing a signal indicative of a property of an earth formation, the apparatus comprising: a carrier configured to be conveyed through a borehole penetrating the earth formation; a neutron source disposed on the carrier and configured to emit neutrons into the earth formation; a radiation detector disposed on the carrier and configured to detect radiation from the earth formation due to interaction of emitted neutrons with the earth formation and to provide the signal indicative of the property; and a radiation detector neutron shield configured to shield the radiation detector from emitted neutrons that did not interact with the earth formation; wherein the radiation detector shield comprises a glass ceramic material having a plurality of nano-crystallites, each nano-crystallite in the plurality having a periodic crystal structure with a diameter or dimension that is less than 1000 nm that includes Li and/or Boron and a rare-earth element that have positions in the periodic crystal structure of each nano-crystallite.

Embodiment 2

The apparatus according to claim 1, wherein the radiation detector shield defines an opening configured to admit the radiation from the earth formation due to interaction of emitted neutrons with the earth formation.

Embodiment 3

The apparatus according to claim 1, further comprising: downhole electronics disposed on the carrier, coupled to the radiation detector and configured to process the signal indicative of the property to estimate the property; and a downhole electronics neutron shield configured to shield the downhole electronics from neutrons emitted by the neutron source; wherein the downhole electronics shield comprises a glass ceramic material having a plurality of nano-crystallites, each nano-crystallite in the plurality having a periodic crystal structure with a diameter or dimension that is less than 1000 nm and includes a rare-earth element that has positions in the periodic crystal structure of each nano-crystallite.

Embodiment 4

The apparatus according to claim 3, wherein at least one of the detector neutron shield and the downhole electronics neutron shield comprises a plurality of sections.

Embodiment 5

The apparatus according to claim 4, where the plurality of sections is connected by at least one of an adhesive and a mechanical fastener.

Embodiment 6

The apparatus according to claim 1, wherein the radiation detector comprises a neutron detector.

Embodiment 7

The apparatus according to claim 1, wherein the radiation detector comprises a gamma-ray detector.

Embodiment 8

The apparatus according to claim 1, wherein the property is porosity and/or density.

Embodiment 9

The apparatus according to claim 1, wherein the glass ceramic material comprises a composition of $^{10}$B, $^{6}$Li and rare-earth oxides, $Sm_2O_3$, $Er_2O_3$, $Yb_2O_3$, $Nd_2O_3$.

Embodiment 10

The apparatus according to claim 1, wherein the glass ceramic material comprises a composition of a natural B and rare-earth oxides, $Sm_2O_3$, $Er_2O_3$, $Yb_2O_3$, and $Nd_2O_3$.

Embodiment 11

The apparatus according to claim 1, wherein the glass ceramic material comprises a $^{10}$B and rare-earth oxides, $Sm_2O_3$, $Er_2O_3$, $Yb_2O_3$, $Nd_2O_3$.

Embodiment 12

The apparatus according to claim 1, wherein the radiation detector neutron shield comprises an electrical penetration for electrically connecting an electrical conductor to the radiation detector.

Embodiment 13

The apparatus according to claim 1, wherein the carrier comprises at least one of a drill string, coiled tubing, a slickline and a wireline.

Embodiment 14

A method for providing a signal indicative of a property of an earth formation, the method comprising: conveying a carrier through a borehole penetrating the earth formation; emitting neutrons into the earth formation using a neutron source disposed on the carrier; detecting radiation from the earth formation due to interaction of emitted neutrons with the earth formation using a radiation detector configured to provide a signal indicative of the property; shielding the radiation detector from emitted neutrons that did not interact with the earth formation using a radiation detector neutron shield, wherein the radiation detector shield comprises a glass ceramic material having a plurality of nano-crystallites, each nano-crystallite in the plurality having a periodic crystal structure with a diameter or dimension that is less than 1000 nm that includes Li and/or B and a rare-earth element that have positions in the periodic crystal structure of each nano-crystallite.

Embodiment 15

The method according to claim 14, further comprising shielding downhole electronics disposed on the carrier and coupled to the radiation detector from neutrons emitted by the neutron source using a downhole electronics neutron shield, the downhole electronics neutron shield comprising a glass ceramic material having a glass ceramic material that includes a plurality of nano-crystallites, each nano-crystallite in the plurality having a periodic crystal structure with a diameter or dimension that is less than 1000 nm and includes a rare-earth element that has positions in the periodic crystal structure of each nano-crystallite.

Embodiment 16

The method according to claim 14, wherein the glass ceramic material comprises a composition of $^{10}$B, $^{6}$Li and rare-earth oxides, Sm2O3, Er2O3, Yb2O3, Nd2O3.

Embodiment 17

The method according to claim 14, wherein the glass ceramic material comprises a composition of a natural B and rare-earth oxides, Sm2O3, Er2O3, Yb2O3, and Nd2O3.

The method according to claim 14, wherein the glass ceramic material comprises a composition of $^{10}$B and rare-earth oxides, Sm2O3, Er2O3, Yb2O3, Nd2O3.

In support of the teachings herein, various analysis components may be used, including a digital and/or an analog system. For example, radiation detector 12, the downhole electronics 15, the computer processing system 16, and/or the telemetry may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates to one or more structural limitations of a device that are required for the device to perform the function or operation for which the device is configured.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for providing a signal indicative of a property of an earth formation, the apparatus comprising:
   a carrier configured to be conveyed through a borehole penetrating the earth formation;
   a neutron source disposed on the carrier and configured to emit neutrons into the earth formation;
   a radiation detector disposed on the carrier and configured to detect radiation from the earth formation due to interaction of emitted neutrons with the earth formation and to provide the signal indicative of the property; and
   a radiation detector neutron shield configured to shield the radiation detector from emitted neutrons that did not interact with the earth formation;
   wherein the radiation detector shield comprises a glass ceramic material having a plurality of nano-crystallites, each nano-crystallite in the plurality having a periodic crystal structure with a diameter or dimension that is less than 1000 nm that includes Li and/or Boron and a rare-earth element that have positions in the periodic crystal structure of each nano-crystallite.

2. The apparatus according to claim 1, wherein the radiation detector shield defines an opening configured to admit the radiation from the earth formation due to interaction of emitted neutrons with the earth formation.

3. The apparatus according to claim 1, further comprising:
   downhole electronics disposed on the carrier, coupled to the radiation detector and configured to process the signal indicative of the property to estimate the property; and
   a downhole electronics neutron shield configured to shield the downhole electronics from neutrons emitted by the neutron source;
   wherein the downhole electronics shield comprises a glass ceramic material having a plurality of nano-crystallites, each nano-crystallite in the plurality having a periodic crystal structure with a diameter or dimension that is less than 1000 nm and includes a rare-earth element that has positions in the periodic crystal structure of each nano-crystallite.

4. The apparatus according to claim 3, wherein at least one of the detector neutron shield and the downhole electronics neutron shield comprises a plurality of sections.

5. The apparatus according to claim 4, where the plurality of sections is connected by at least one of an adhesive and a mechanical fastener.

6. The apparatus according to claim 1, wherein the radiation detector comprises a neutron detector.

7. The apparatus according to claim 1, wherein the radiation detector comprises a gamma-ray detector.

8. The apparatus according to claim 1, wherein the property is porosity and/or density.

9. The apparatus according to claim 1, wherein the glass ceramic material comprises a composition of $^{10}$B, $^{6}$Li and rare-earth oxides, $Sm_2O_3$, $Er_2O_3$, $Yb_2O_3$, $Nd_2O_3$.

10. The apparatus according to claim 1, wherein the glass ceramic material comprises a composition of a natural B and rare-earth oxides, $Sm_2O_3$, $Er_2O_3$, $Yb_2O_3$, and $Nd_2O_3$.

11. The apparatus according to claim 1, wherein the glass ceramic material comprises a composition of $^{10}$B and rare-earth oxides, $Sm_2O_3$, $Er_2O_3$, $Yb_2O_3$, $Nd_2O_3$.

12. The apparatus according to claim 1, wherein the radiation detector neutron shield comprises an electrical penetration for electrically connecting an electrical conductor to the radiation detector.

13. The apparatus according to claim 1, wherein the carrier comprises at least one of a drill string, coiled tubing, a slickline and a wireline.

14. A method for providing a signal indicative of a property of an earth formation, the method comprising:
   conveying a carrier through a borehole penetrating the earth formation;
   emitting neutrons into the earth formation using a neutron source disposed on the carrier;
   detecting radiation from the earth formation due to interaction of emitted neutrons with the earth formation using a radiation detector configured to provide a signal indicative of the property;
   shielding the radiation detector from emitted neutrons that did not interact with the earth formation using a radiation detector neutron shield, wherein the radiation detector shield comprises a glass ceramic material having a plurality of nano-crystallites, each nano-crystallite in the plurality having a periodic crystal structure with a diameter or dimension that is less than 1000 nm that includes Li and/or B and a rare-earth element that have positions in the periodic crystal structure of each nano-crystallite.

15. The method according to claim 14, further comprising shielding downhole electronics disposed on the carrier and coupled to the radiation detector from neutrons emitted by the neutron source using a downhole electronics neutron shield, the downhole electronics neutron shield comprising a glass ceramic material having a glass ceramic material that includes a plurality of nano-crystallites, each nano-crystallite in the plurality having a periodic crystal structure with a diameter or dimension that is less than 1000 nm and includes a rare-earth element that has positions in the periodic crystal structure of each nano-crystallite.

16. The method according to claim 14, wherein the glass ceramic material comprises a composition of $^{10}$B, $^{6}$Li and rare-earth oxides, $Sm_2O_3$, $Er_2O_3$, $Yb_2O_3$, $Nd_2O_3$.

17. The method according to claim 14, wherein the glass ceramic material comprises a composition of a natural B and rare-earth oxides, $Sm_2O_3$, $Er_2O_3$, $Yb_2O_3$, and $Nd_2O_3$.

18. The method according to claim 14, wherein the glass ceramic material comprises a composition of $^{10}$B and rare-earth oxides, $Sm_2O_3$, $Er_2O_3$, $Yb_2O_3$, $Nd_2O_3$.

* * * * *